United States Patent Office 3,426,099
Patented Feb. 4, 1969

3,426,099
POLYURETHANE ELASTOMERS CONTAINING AN INTERPOLYMER OF AN α,β-UNSATURATED DICARBOXYLIC ACID ANHYDRIDE AND AN ETHYLENICALLY UNSATURATED MONOMER
Milton Freifeld, Easton, Pa., and George S. Mills, Boonton, and Richard J. Nelson, Caldwell, N.J., assignors to GAF Corporation, a corporation of Delaware
No Drawing. Filed Feb. 10, 1966, Ser. No. 526,375
U.S. Cl. 260—859         11 Claims
Int. Cl. C08g 41/00, 51/58

ABSTRACT OF THE DISCLOSURE

A polyurethane composition of improved stability against discoloration and improved tensile strength comprising a linear thermoplastic polyester urethane elastomer and from about 0.1% to about 10% by weight of an interpolymer of an α,β-unsaturated dicarboxylic acid anhydride and an ethylenically unsaturated monomer.

---

This invention relates to improvements in polyurethane elastomeric compositions, and more particularly to compositions comprising linear thermoplastic polyurethanes which are characterized by outstanding improvements in color stability as well as tensile strength properties by the incorporation therewith of minor amounts of carboxyl-containing interpolymers. The use of various additives to improve the properties of elastomers such as antioxidants, color stabilizers, discoloration inhibitors and the like is well known and the use of certain carboxylated polymers as discoloration inhibitors specifically for elastomeric polyurethanes is well known. It has now been unexpectedly found that such elastomers may not only be markedly improved in color stability and discoloration tendencies but also tremendous improvements in tensile strength are forthcoming if such polyurethane materials are compounded with interpolymers derived from an α,β-unsaturated acid anhydride and an ethylenically unsaturated comonomer.

It is therefore an object of the present invention to provide new, useful and outstanding compositions comprising linear thermoplastic elastomeric polyurethanes.

It is still another object of the present invention to provide elastomeric polyurethane compositions which have unexpected stability towards color formation.

It is still another object of the present invention to provide polyurethane compositions which are outstandingly stable against discoloration.

It is still another further object of the present invention to provide polyurethane elastomer compositions which have unexpected improved tensile strength properties.

It is still another further object of the present invention to provide processes for the color stabilization of elastomeric polyurethane compositions.

Another object of the present invention lies in the provision of processes for improving the tensile strength of thermoplastic elastomeric polyurethane materials.

Other objects will appear hereinafter as the description proceeds.

It has now been discovered that by the incorporation of minor amounts of from about 0.1% to about 10% by weight based on the weight of elastomer of an interpolymer of an α,β-ethylenically unsaturated carboxylic acid anhydride with an ethylenically unsaturated comonomer in thermoplastic polyurethane elastomers, and in particular such polyurethanes which are essentially linear and are derived from the interaction of hydroxyl terminated polyesters, a saturated aliphatic glycol, and a diphenyl diisocyanate, gives rise to outstanding, unusual and unexpected properties which are readily manifested in the resin composition. The specific improvements relate to improved color of the resin, improved color stability, improved resistance to discoloration, and finally, improvements in tensile strength properties thereof.

While the improvements which are obtained by the use of the interpolymers hereinafter described generally result by the addition thereof to the broad class of thermoplastic urethane materials, the most outstanding results are achieved with those polyurethane elastomers which are thermoplastic in nature and essentially linear, i.e., substantially free of cross-linking in the molecule. Such polyurethanes are well known and include specifically those which are described in U.S. Patent 2,871,218 and the disclosure in this patent with respect to the polyurethane elastomers, their method of preparation and their chemical composition as well as the properties thereof are hereby incorporated herein by reference thereto.

The interpolymer additives which are herein contemplated comprise those derived from acid anhydrides on the one hand and an ethylenically unsaturated monomer on the other hand, and preferably anhydrides which are classified as α,β-unsaturated dicarboxylic acid anhydrides. Of the latter, those of the maleic anhydride series are preferred having the formula:

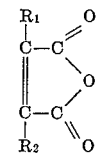

wherein $R_1$ and $R_2$ are independently selected from the group consisting of hydrogen, halogen, sulfo, alkyl, aryl, aralkyl, alkaryl, and various substituted forms thereof such as chloroalkyl, bromoalkyl, fluoroalkyl, cyanoalkyl, hydroxyalkyl, alkoxyalkyl, carbalkoxyalkyl, sulfonylalkyl, chlorophenyl, tolyl, alkoxyphenyl, carboxyphenyl, carbalkoxyphenyl, chloronaphthyl, bromonaphthyl, alkoxynaphthyl, methyl sulfonyl phenyl, sulfophenyl, sulfonaphthyl, and the like.

Illustrative compounds include:

maleic anhydride
chloromaleic anhydride
methylmaleic anhydride
sulfomaleic anhydride
phenylmaleic anhydride
benzylmaleic anhydride
fumaric anhydride
mesaconic anhydride, and
aconitic anhydride.

In addition, other unsaturated anhydrides such as itaconic, methylene malonic, allyl succinic, and the like may be used.

The copolymerizable monomers containing a $>C=CH_2$ group which may be employed with the above described anhydride include all of the known ethylenically unsaturated copolymerizable compounds such as:
vinyl ethers, e.g., vinyl methyl ether
    vinyl ethyl ether
    vinyl n-propyl ether
    vinyl iso-propyl ether
    vinyl n-butyl ether
    vinyl iso-butyl ether
    vinyl iso-octyl ether
    vinyl phenyl ether
    α-chlorovinyl phenyl ether
    vinyl β-naphthyl ether vinyl esters, e.g.,
  vinyl acetate
  vinyl propionate
  vinyl butyrate
  vinyl caproate
  vinyl stearate, etc.
vinyl halides, e.g.,
  vinyl chloride
  vinyl fluoride
  vinyl bromide
acrylic acid and esters, e.g.,
  methyl acrylate
  ethyl acrylate
  propyl acrylate
acrylic acid derivatives, e.g.,
  methacrylic acid and esters
  α-haloacrylic acid and esters
  acrylonitrile
  methacrylonitrile
  acrylamide
  methacrylamide
  N-alkyl acrylamides
  N-aryl acrylamides
N-vinyl heterocycles, e.g.,
  N-vinyl pyrrolidone
  N-vinyl-3-morpholinones
  N-vinyl-oxazolidone
  N-vinyl-imidazole
styrene
alkyl styrenes, e.g., α-methyl styrene
vinylidene chloride
vinyl ketones, e.g., methyl vinyl ketone
olefins such as
  ethylene
  propylene
  isobutylene
  butene-1
2,4,4-trimethyl pentene-1
hexene-1
3-methyl-butene-1, and the like The anhydride-ethylenically unsaturated interpolymers preferably contain the two moieties in equimolar amounts whereby the repeating unit in the interpolymer contains 1 anhydride and 1 comonomer moiety. The interpolymers may, however, contain the two moieties in amounts somewhat varying from equimolar amounts and particularly in amounts varying from about 5:4 to 4:5.

Examples of specific interpolymers which may be employed are:

vinyl methyl ether-maleic anhydride
vinyl ethyl ether-maleic anhydride
styrene-maleic anhydride
α-methyl styrene-maleic anhydride
ethylene-maleic anhydride
vinyl methyl ether-citraconic anhydride
vinyl methyl ether-itaconic anhydride
vinyl methyl ether-chlormaleic anhydride
vinyl chloride-maleic anhydride
vinyl acetate-maleic anhydride
vinyl chloride-vinyl acetate-maleic anhydride
styrene-vinyl acetate-maleic anhydride While obviously the above described interpolymers may be prepared and exist in average molecular weights ranging from several hundred to several million, and while the molecular weight of the specific interpolymers employed in the present invention is not critical, it is, nevertheless, preferred to employ such interpolymers which have a minimum average molecular weight of about 1000 and still more specifically those which are characterized by specific viscosities ranging from about 0.1 to 5.0. The specific viscosity is determined on a solution of 1 g. of the copolymer in 100 ml. of methyl ethyl ketone at 25° C. These viscosity measurements are commonly used as an indication of the average molecular weight of the polymer material. The specific viscosity is determined on a solution of 1 g. of the copolymers in 100 ml. of methyl ethyl ketone at 25° C. These viscosity measurements are commonly used as an indication of the average molecular weight of the polymer material. The specific viscosity is related to the relative viscosity by the following equation:

$$\mu_{rel} = \mu_{sp} + 1$$

The inherent viscosity is defined as:

$$\log_e \mu_{rel}/c$$

and the intrinsic viscosity is the limit of inherent viscosity as the concentration approaches zero. From these viscosity measurements and relationships one can obtain a molecular weight relationship by the use of such techniques as the Mark-Houirk equation, see Makromolecule Chemie, vol. 37, pages 187–197, or a derivation of the K value (Fikentscher), see Modern Plastics, vol. 23, No. 3, pages 157–161, 212, 214, 216 and 218 (1945).

The interpolymer may be incorporated into the polyurethane material in any suitable, convenient or conventional way. Thus the polymer additive may be admixed in the solid state with the polymer in the solid state, or in solution. Alternatively, the interpolymer may be added as a solution in a suitable solvent to solid urethane material, or a suspension or solution of the latter. In any event, by the intimate admixture of the interpolymer additive with the polyurethane elastomer can one derive the outstanding benefits of the present invention. The final physical form of the additive-elastomer composition is immaterial insofar as the benefits of the present invention are concerned. Thus, compositions in the form of cast films from solutions, extruded films, fibers, and molded objects all are characterized by the outstanding and unusual properties which have been described as flowing from the use of the interpolymer additives hereinbefore described. The following examples will serve to illustrate the present invention without being deemed limitative thereof. Parts are by weight unless otherwise indicated.

Example 1

A polyurethane elastomer is prepared by the interaction of 2 moles of an hydroxyl terminated polytetramethylene adipate (molecular weight about 1000, hydroxyl number 105), 2.2 moles of 1,4-butanediol heated for 20 minutes at 8 mm. pressure at a temperature of 100° C., and to this there is thereafter added 4.15 moles of diphenyl methane p,p′-diisocyanate. The mixture is stirred for a few minutes and then heated for about 2½ hours at 145° C. A clear elastomer is obtained which is thermoplastic and soluble in dimethyl formamide (DMF), methyl ethyl ketone and acetone. A master batch mix of this resin and pigment is prepared, finally rolling the resin at a temperature of 75° to 120° F. through a 4″ x 8″ two-roll mill ten to twelve times. The mix consists of 50 parts resin, 5 parts titanium dioxide and 0.075 part ultramarine blue pigment. The pigmented elastomer is then divided into five equal parts and the following additives are milled therein on a cool 2″ x 6″ two-roll mill. To the first (A) is added 10% by weight based on the weight of the elastomer of a commercially available carboxylated acrylonitrile terpolymer, to a second (B) 5 parts by weight per hundred parts of the resin of another commercially available carboxylated polymer, to the third (C) 2.5 parts by weight per hundred parts of the elastomer of a 1:1 interpolymer maleic anhydride with methyl vinyl ether, specific viscosity 1.0, to the fourth sample (D) there is added 5 parts by weight of the same interpolymer, and to the fifth final sample (E), no additive was introduced. The commercial carboxylated materials used in samples 1 and 2 have been described as effective discoloration inhibitors for the elastomeric polyurethane.

Solutions of each of the five formulations A–F are prepared in methyl ethyl ketone at about 15% concentrations (by weight). Films are then prepared from each of the five solution samples and drawn to 0.033 in. on clean glass plates. The films are dried slowly to obtain smooth surfaces. The dry films have a thickness of about 0.005 in.

Micro-dumbbell test samples are cut from the above films and evaluated in triplicate on an Instron machine. The results are as follows:

| Sample | Tensile strength, p.s.i. | Percent breaking elongation | P.s.i. stress at 200% elong. |
|---|---|---|---|
| 1 | 5,280 | 1,100 | 600 |
| 2 | 4,400 | 1,060 | 630 |
| 3 | 6,900 | 1,150 | 740 |
| 4 | 7,410 | 1,100 | 850 |
| 5 | 6,400 | 1,180 | 690 |

Samples 3 and 4, which contain the interpolymer additives used in the present invention, show a vast improvement in tensile strength as compared with control sample 5, and the samples are further obviously far superior in benefiting this property of tensile strength to the additives used in samples 1 and 2. As a matter of fact, the additives in samples 1 and 2 cause a sharp loss in tensile strength. The above data further demonstrates that the elongation is not seriously affected by the concomitant increase in tensile strength afforded by the additives used in this invention. Still further, the interpolymer additives used and contemplated herein give rise to a substantial increase in the 200% modulus whereas the commercial additives in samples 1 and 2 cause a decrease in the value of this property. The above prepared films are also exposed for 40 hours in a xenon lamp Fade-Ometer. The control sample 5, after this exposure, yellows badly whereas the other four samples are only slightly affected.

The above data clearly demonstrates that the interpolymer additives used in this invention not only lead to a vastly improved tensile strength, not only lead to an improvement in the modulus, not only do not adversely affect the elongation properties but also vastly improve the color stability and resistance to the discoloration of the polyurethane material in contradistinction to the commercial additives which only improve the discoloration resistance and markedly decrease the tensile strength and the 200% modulus characteristic.

Example 2

An elastomeric polyurethane resin (B) is prepared as follows: A mixture of 1.6 moles of hydroxyl terminated polytetramethylene adipate (molecular weight 840, hydroxyl number 125) and 1.2 moles of 1,4-butanediol is heated for 25 minutes at 5 mm. pressure at a temperature of 100° C. To the mixture there is then added 2.8 moles of diphenyl methane p,p'-diisocyanate. The mixture is stirred for a few minutes and then heated in a sealed vessel for 3 hrs. at 145° C. A master batch mix of this resin is prepared similarly as in Example 1 except that 50 passes through the roll mill are made and processing is conducted at 120° to 150° F. Five separate additive formulations are also prepared similarly as in example 1 and 20% solutions thereof are made up in tetrahydrofurane. Films are cast as in the previous example with the results showing a similar improvement in properties using the interpolymers described herein vis-a-vis the other formulations.

Example 3

A 15% solution of the formulation (A) of Example 1 (but containing double the additive terpolymer), representing 13.8 grams of solids, is blended with an 18.5% solution of the master batch of Example 2 (no additive and representing 13.8 grams of resin and pigment solids) to yield a cement containing, for each 100 parts resin by weight, 10 parts titanium dioxide, 0.05 part ultramarine blue, and 5 parts of the carboxylated acrylonitrile terpolymer. Similar blends are prepared with each of formulations B–E (again each containing twice the additive concentration) and the solution of master batch of Example 2 to yield, again, for each 100 parts of resin, 10 parts titanium dioxide and 0.05 part of ultramarine blue. The blend with formulation B of Example 1 also contains 5 parts of additive polymer. The blend with formulation (C) also contains 2.5 parts of the interpolymer, and the blend with formulation (D) also contains 5 parts of the same interpolymer. Formulation (E), of course, contains no further additive.

Physical tests of films prepared from the 5 samples are carried out as in Example 1 with the following results:

| Sample | Tensile strength, p.s.i. | Percent breaking elongation | P.s.i. stress at 200% elong. |
|---|---|---|---|
| 1 | 5,360 | 1,200 | 620 |
| 2 | 4,490 | 1,080 | 660 |
| 3 | 6,810 | 1,140 | 730 |
| 4 | 7,360 | 1,080 | 830 |
| 5 | 6,420 | 1,190 | 700 |

Example 4

Example 1 is repeated using the following interpolymers as additives in the amounts indicated in parts per hundred parts of elastomer:

A. 0.1 part PVM/MA [1] (1:1 [2]—$\mu_{sp}$ [3] =0.5)
B. 1.0 part PVM/MA (1:1—$\mu_{sp}$=0.5)
C. 10.0 parts PVM/MA (1:1—$\mu_{sp}$=0.5)
D. 0.5 part PVM/MA (1:1—$\mu_{sp}$=1.4)
E. 5.0 parts PVM/MA (1:1—$\mu_{sp}$=1.4)
F. 10.0 parts PVM/MA (1:1—$\mu_{sp}$=1.4)
G. 2.0 parts PVM/MA (1:1—$\mu_{sp}$=2.5)
H. 4.0 parts PVM/MA (1:1—$\mu_{sp}$=2.5)
I. 8.0 parts PVM/MA (1:1—$\mu_{sp}$=2.5)
J. 0.5 part PVM/MA (1:1—$\mu_{sp}$=4.0)
K. 3.5 parts PVM/MA (1:1—$\mu_{sp}$=4.0)
L. 6.0 parts PVM/MA (1:1—$\mu_{sp}$=4.0)
M. 2.5 parts E/MA [4] (1:1—M.W.=200,000)

[1] Methyl vinyl ether-maleic anhydride interpolymer.
[2] Mole ratio of coreactants in interpolymer.
[3] Specific viscosity.
[4] Ethylene-maleic anhydride interpolymer.

The improvements are comparable to Example 1.

Example 5

Examples 2 and 3 are repeated using the following interpolymer additives in the amounts indicated in parts per hundred parts of total elastomer:

A. 0.2 part PVM/MA (1:1—$\mu_{sp}$=0.6)
B. 1.5 parts PVM/MA (1:1—$\mu_{sp}$=0.6)
C. 7.5 parts PVM/MA (1:1—$\mu_{sp}$=0.6)
D. 0.2 part PVM/MA (1:1—$\mu_{sp}$=1.4)
E. 4.0 parts PVM/MA (1:1—$\mu_{sp}$=1.4)
F. 1.0 part PVM/MA (1:1—$\mu_{sp}$=2.5)
G. 5.0 parts PVM/MA (1:1—$\mu_{sp}$=2.5)
H. 2.5 parts E/MA (1:1—$\mu_{sp}$=0.6)

The improvements are comparable to Examples 2 and 3.

Example 6

Example 3 is again repeated except that one sample is prepared with 5 parts of E/MA (1:1—$\mu_{sp}$=0.6). The resultant film has a tensile strength of 5920 p.s.i. and a percent breaking elongation of 1100; this compares with a control sample containing no additives which has a tensile strength of 5320 p.s.i. and a percent breaking elongation of 1090.

Example 7

In this example, there is demonstrated the outstanding benefits of the interpolymers employed in this invention as additives for the elastomers alone without filler.

50 parts of elastomer of Example 1 and 1.2 parts of the methyl vinyl ether-maleic anhydride interpolymer of that example are made into a smooth, clear cement in methyl ethyl ketone. Films are prepared and tested as in Example 1. The tensile strength is 6600 p.s.i. and the percent breaking elongation is 1045. In the absence of the interpolymer the tensile strength is 5000 and the percent breaking elongation is 1020.

Example 8

50 parts of the elastomer of Example 1 and 50 parts of the elastomer (B) of Example 2 are blended from solutions thereof (methyl ethyl ketone solution of elastomer of Example 1 and tetrahydrofuran solution of elastomer (B) of Example 2) and 2.5 parts of the interpolymer of Example 1 are dissolved in the blended cement. Films are cast and tested as in Example 1. The tensile strength is 6800 p.s.i. and percent breaking elongation is 1040. In the absence of the interpolymer the films have a tensile strength of 5100 p.s.i. and a percent breaking elongation of 1030.

Example 9

Example 7 is repeated except that resin (B) of Example 2 is used in place of the elastomer of Example 1. A substantial improvement in tensile strength is noted along with outstanding resistance to discoloration in both a carbon arc wetherometer and a xenon Fade-Ometer.

Example 10

Example 1 is repeated using in place of 1,4-butanediol an equivalent weight of 1,6-hexanediol.

Example 11

Example 1 is repeated using 1 mole of 1,4-butanediol.

Example 12

Example 1 is repeated using 2.5 moles of the diisocyanate in place of 4.15 moles.

Example 13

Example 1 is repeated replacing the diisocyanate with the following:

(a) dichlorodiphenyl methane diisocyanate,
(b) diphenyl ether diisocyanate,
(c) dimethyl diphenyl methane diisocyanate.

Other variations in and modifications of the described processes which will be obvious to those skilled in the art can be made in this invention without departing from the scope or spirit thereof.

We claim:
1. A polyurethane based elastomeric composition of improved color stability and tensile strength consisting essentially of
   A. a linear, thermoplastic polyester-urethane elastomer and
   B. from about 0.1% to about 10% by weight based on the weight of (A) of an anhydride containing interpolymer of
      I. an α,β-unsaturated dicarboxylic acid anhydride with
      II. an ethylenically unsaturated monomer,
   wherein the components I and II are present in a mole ratio of from about 5:4 to 4:5.
2. A composition as defined in claim 1 wherein component I is maleic anhydride.
3. A composition as defined in claim 1 wherein component II is an alkyl vinyl ether.
4. A composition as defined in claim 1 where interpolymer (A) is a maleic anhydride-alkyl vinyl ether interpolymer.
5. A composition as defined in claim 4 wherein the alkyl vinyl ether contains from 1 to 8 carbon atoms in the alkyl chain.
6. A composition as defined in claim 5 wherein the alkyl vinyl ether is methyl vinyl ether.
7. A composition as defined in claim 2 wherein the components I and II are present in about a 1:1 mole ratio.
8. A composition as defined in claim 5 wherein the components I and II are present in about a 1:1 mole ratio.
9. A composition as defined in claim 1 wherein the elastomer is derived from
   (A) an hydroxyl terminated polyester and
   (B) a diphenyl diisocyanate.
10. A composition as defined in claim 11 wherein the polyester has an average molecular weight of at least about 600.
11. A composition as defined in claim 1 wherein the elastomer is derived from
   (A) a linear, hydroxy terminated polyester of average molecular weight of at least 600.
   (B) an α,ω-glycol of from 4 to 100 carbon atoms, and
   (C) a diphenyl diisocyanate,
the ingredients A, B and C being reacted in the molar range of from about 1, 0.1, and 1.1 to about 1, 2.1, and 3.1, whereby essentially no unreacted isocyanate and hydroxyl groups are present.

References Cited

UNITED STATES PATENTS

| | | | |
|---|---|---|---|
| 2,891,876 | 6/1959 | Brown | 260—859 |
| 2,981,637 | 4/1961 | Spencer | 260—859 |
| 3,055,859 | 9/1962 | Vollmert | 260—859 |
| 3,271,342 | 9/1966 | Kuhn | 260—859 |

FOREIGN PATENTS 840,093   7/1960   Great Britain.

SAMUEL H. BLECH, *Primary Examiner.*

P. LIEBERMAN, *Assistant Examiner.*

U.S. Cl. X.R.

260—75, 78.5, 32.8, 32.6, 41